(12) United States Patent
Taraba et al.

(10) Patent No.: US 10,915,707 B2
(45) Date of Patent: Feb. 9, 2021

(54) WORD REPLACEABILITY THROUGH WORD VECTORS

(71) Applicant: MachineVantage, Inc., Piedmont, CA (US)

(72) Inventors: Peter Taraba, Berkeley, CA (US); Ratnakar Dev, San Rafael, CA (US); Anantha K. Pradeep, Piedmont, CA (US)

(73) Assignee: MACHINEVANTAGE, INC., Berkeley, CA (US)

( * ) Notice: Subject to any disclaimer, the term of this patent is extended or adjusted under 35 U.S.C. 154(b) by 175 days.

(21) Appl. No.: 16/165,785

(22) Filed: Oct. 19, 2018

(65) Prior Publication Data

US 2019/0121849 A1 Apr. 25, 2019

Related U.S. Application Data

(60) Provisional application No. 62/575,242, filed on Oct. 20, 2017.

(51) Int. Cl.
*G06F 40/284* (2020.01)
*G06N 20/00* (2019.01)
(Continued)

(52) U.S. Cl.
CPC ...... *G06F 40/284* (2020.01); *G06F 16/90335* (2019.01); *G06F 40/247* (2020.01);
(Continued)

(58) Field of Classification Search
CPC .... G06F 40/242; G06F 40/247; G06F 40/268; G06F 40/30; G06F 16/243;
(Continued)

(56) References Cited

U.S. PATENT DOCUMENTS 5,442,546 A * 8/1995 Kaji .................. G06F 40/45
704/4
5,619,709 A * 4/1997 Caid .................. G06F 16/58
715/209

(Continued)

OTHER PUBLICATIONS

Y. Bengio, R. Ducharme, P. Vincent, and C. Jauvin, 2003, "A Neural Probabilistic Language Model. Journal of Machine Learning Research," 3(6):1137-1155.

(Continued)

*Primary Examiner* — Eric Yen
(74) *Attorney, Agent, or Firm* — Kwan & Olynick LLP

(57) ABSTRACT

Provided are systems, methods, and devices for providing word replaceability information through word vectors. Within a database system, a text document is received, then processed into a number of sub-sentences or sub-segments. The processing involved delimiting one or more sentences within the text document by one or more punctuation marks. Next, a number of n-gram combinations are generated according to co-appearances of n-grams within the sub-sentences. Distance metrics are determined between the n-gram co-appearances for each n-gram combination. Finally, word replaceability information is provided for one or more words or n-grams within the text document, based on the distance metric.

14 Claims, 5 Drawing Sheets

(51) Int. Cl.
*G06F 16/903* (2019.01)
*G06F 40/247* (2020.01)
*G06F 40/268* (2020.01)
*G06F 40/30* (2020.01)

(52) U.S. Cl.
CPC ............ *G06F 40/268* (2020.01); *G06F 40/30* (2020.01); *G06N 20/00* (2019.01)

(58) Field of Classification Search
CPC ............ G06F 16/3329; G06F 16/3334; G06F 16/3344; G06F 40/284; G06F 16/90335; G06N 20/00
See application file for complete search history.

(56) References Cited

U.S. PATENT DOCUMENTS

| | | | | |
|---|---|---|---|---|
| 5,680,628 | A * | 10/1997 | Carus | G06F 40/253 704/1 |
| 5,907,821 | A * | 5/1999 | Kaji | G06F 40/216 704/4 |
| 6,134,532 | A * | 10/2000 | Lazarus | G06Q 30/02 705/14.25 |
| 6,175,828 | B1 * | 1/2001 | Kuromusha | G06F 16/30 |
| 6,684,221 | B1 * | 1/2004 | Rejndrup | G06F 16/355 |
| 6,847,966 | B1 * | 1/2005 | Sommer | G06F 16/3347 707/739 |
| 6,856,988 | B1 * | 2/2005 | Humphrey | G06F 40/268 707/749 |
| 8,161,041 | B1 * | 4/2012 | Grushetskyy | G06F 16/9535 707/727 |
| 8,793,120 | B1 * | 7/2014 | Fliedner | G06F 40/268 704/9 |
| 9,754,020 | B1 * | 9/2017 | Kosloski | G06F 16/3344 |
| 10,121,467 | B1 * | 11/2018 | Gandhe | G06F 40/289 |
| 10,380,236 | B1 * | 8/2019 | Ganu | G06F 40/126 |
| 10,380,248 | B1 * | 8/2019 | Lai | G06F 40/284 |
| 10,417,350 | B1 * | 9/2019 | Mohamed | G06F 40/58 |
| 10,459,962 | B1 * | 10/2019 | Jayaraman | G06F 16/3347 |
| 2003/0004915 | A1 * | 1/2003 | Lin | G06F 40/253 |
| 2003/0023422 | A1 * | 1/2003 | Menezes | G06F 40/45 704/2 |
| 2003/0126561 | A1 * | 7/2003 | Woehler | G06F 16/355 715/256 |
| 2004/0006457 | A1 * | 1/2004 | Dehlinger | G06F 16/35 704/5 |
| 2004/0006736 | A1 * | 1/2004 | Kawatani | G06F 16/3347 715/256 |
| 2004/0172235 | A1 * | 9/2004 | Pinkham | G06F 40/211 704/2 |
| 2004/0194036 | A1 * | 9/2004 | Wolska | G06F 40/284 715/230 |
| 2004/0205457 | A1 * | 10/2004 | Bent | G06F 40/258 715/230 |
| 2005/0005266 | A1 * | 1/2005 | Datig | G06N 5/02 717/136 |
| 2005/0149516 | A1 * | 7/2005 | Wolf | G06F 16/00 |
| 2005/0216443 | A1 * | 9/2005 | Morton | G06F 16/447 |
| 2006/0009963 | A1 * | 1/2006 | Gaussier | G06F 40/45 704/7 |
| 2006/0224569 | A1 * | 10/2006 | DeSanto | G06F 40/247 |
| 2007/0016571 | A1 * | 1/2007 | Assadian | G06F 40/247 |
| 2008/0065974 | A1 * | 3/2008 | Campbell | G06Q 10/107 715/200 |
| 2009/0006359 | A1 * | 1/2009 | Liao | G06F 16/374 |
| 2009/0083218 | A1 * | 3/2009 | Rejndrup | G06Q 50/22 |
| 2010/0198821 | A1 * | 8/2010 | Loritz | G06F 16/90332 707/728 |
| 2011/0082687 | A1 * | 4/2011 | Pham | G06F 16/3338 704/9 |
| 2011/0099052 | A1 * | 4/2011 | Brun | G06F 40/194 705/7.38 |
| 2011/0137636 | A1 * | 6/2011 | Srihari | G06F 40/53 704/2 |
| 2011/0313757 | A1 * | 12/2011 | Hoover | G06F 40/205 704/9 |
| 2012/0078612 | A1 * | 3/2012 | Kandekar | G06F 3/0482 704/9 |
| 2012/0084281 | A1 * | 4/2012 | Colosi | H04L 29/12641 707/723 |
| 2013/0036114 | A1 * | 2/2013 | Wong | G06F 16/9535 707/732 |
| 2013/0158982 | A1 * | 6/2013 | Zechner | G10L 15/1815 704/9 |
| 2013/0159313 | A1 * | 6/2013 | Jakubik | G06F 16/35 707/739 |
| 2013/0185307 | A1 * | 7/2013 | El-Yaniv | G06N 20/00 707/748 |
| 2014/0006861 | A1 * | 1/2014 | Jain | G06N 5/022 714/26 |
| 2014/0039877 | A1 * | 2/2014 | Guenigault | G06F 40/10 704/9 |
| 2014/0067368 | A1 * | 3/2014 | Yih | G06F 16/3338 704/9 |
| 2014/0156266 | A1 * | 6/2014 | Tsang | G06F 3/16 704/9 |
| 2014/0278341 | A1 * | 9/2014 | Ranjan | G06F 40/51 704/2 |
| 2014/0330860 | A1 * | 11/2014 | Yi | G06F 16/9535 707/769 |
| 2015/0039296 | A1 * | 2/2015 | Hashimoto | G06F 40/289 704/9 |
| 2015/0127677 | A1 * | 5/2015 | Wang | G06F 16/245 707/769 |
| 2015/0213096 | A1 * | 7/2015 | Montgomery | G06F 16/248 707/722 |
| 2015/0339288 | A1 * | 11/2015 | Baker | G06F 40/166 704/9 |
| 2015/0356072 | A1 * | 12/2015 | He | G06F 16/3331 704/9 |
| 2016/0125169 | A1 * | 5/2016 | Finn | G06F 16/951 707/692 |
| 2016/0132491 | A1 * | 5/2016 | Watanabe | G06F 40/44 704/4 |
| 2016/0196258 | A1 * | 7/2016 | Ma | G06F 40/30 704/8 |
| 2016/0226813 | A1 * | 8/2016 | Cecchi | H04L 12/1895 |
| 2016/0232142 | A1 * | 8/2016 | Melnikov | G06F 40/151 |
| 2016/0247061 | A1 * | 8/2016 | Trask | G06N 3/04 |
| 2016/0321541 | A1 * | 11/2016 | Liu | G06N 3/08 |
| 2016/0350283 | A1 * | 12/2016 | Carus | G06F 40/30 |
| 2017/0004208 | A1 * | 1/2017 | Podder | G06F 16/367 |
| 2017/0139899 | A1 * | 5/2017 | Zhao | G06F 40/284 |
| 2017/0220559 | A1 * | 8/2017 | Fujiwara | G06F 40/58 |
| 2017/0270097 | A1 * | 9/2017 | Kobayashi | G06F 40/30 |
| 2017/0357890 | A1 * | 12/2017 | Kim | G06F 40/30 |
| 2018/0114144 | A1 * | 4/2018 | Miranda | G06F 40/30 |
| 2018/0123997 | A1 * | 5/2018 | Celedonia | G06Q 10/10 |
| 2018/0145996 | A1 * | 5/2018 | Chakraborty | H04L 63/1425 |
| 2018/0166077 | A1 * | 6/2018 | Yamaguchi | G10L 15/22 |
| 2018/0189298 | A1 * | 7/2018 | Salminen | G06F 16/3347 |
| 2018/0260390 | A1 * | 9/2018 | Murakami | G06F 40/47 |
| 2018/0314687 | A1 * | 11/2018 | Nishimoto | G06T 7/0012 |
| 2018/0365230 | A1 * | 12/2018 | Jang | G06F 40/216 |
| 2019/0179908 | A1 * | 6/2019 | Nakao | G06F 3/16 |

OTHER PUBLICATIONS

R. Collobert and J. Weston. 2008, "A Unified Architecture for Natural Language Processing: Deep Neural Networks with Multitask Learning," Proceedings of the 25th ICML, 8 pages.

L. Finkelstein, E. Gabrilovich, Y. Matias, E. Rivlin, Z. Solan, G. Wolfman, and E. Ruppin. 2002, "Placing Search in Context: The Concept Revisited. ACM Transactions on Information Systems," 20(1):116-131.

F. Hill, R. Reichart, and A. Korhonen. 2015, "Simlex-999: Evaluating Semantic Models with (Genuine) Similarity Estimation," Computational Linguistics, 31 pages.

(56) References Cited

OTHER PUBLICATIONS

A.L. Maas and A.Y. Ng. 2010, "A Probabilistic Model for Semantic Word Vectors," NIPS Workshop on Deep Learning and Unsupervised Feature Learning, 8 pages.

D. McCarthy and R. Navigli. 2007. Semeval-2007 task 10: "The English Lexical Substitution Task," Proceedings of the 4th International Workshop on Semantic Evaluations, 21 pages.

O. Melamud, O. Levy, and I. Dagan. 2015, "A Simple Word Embedding Model for Lexical Substitution," Proceedings of NAACL-HLT 2015, pp. 1-7.

Mikolov, K. Chen, G. Corrado, and J. Dean. 2013, "Efficient Estimation of Word Representations in Vector Space," arXiv preprint, 12 pages.

J. Pennington, R. Socher, and C.D. Manning. 2014, "GloVe: Global Vectors for Word Representation," EMNLP, 14, 12 pages.

G. Salton. 1971, "The Smart Retrieval System: Experiments in Automatic Document Processing," Prentice-Hall, Upper Saddle River, NJ, 14 pages.

G. Salton, A. Wong, and C.S. Yang. 1975, "A Vector Space Model for Automatic Indexing," Communications of the ACM, 18(11):613-620.

R. Speer and C. Havasi. 2012, "Representing General Relational Knowledge in ConceptNet 5," LREC, MIT Media Lab, 8 pages.

P.D. Turney and P. Pantel. 2010, "From Frequency to Meaning: Vector Space Models of Semantics," Journal of Artificial Intelligence Research, 37:141-188.

\* cited by examiner

410

| $w_1$ | $w_2$ | $\|v_1 - v_2\|$ |
|---|---|---|
| oct | dec | 0.500262 |
| oct | feb | 0.51383 |
| nov | dec | 0.514184 |
| aug | feb | 0.516395 |
| nov | jan | 0.520554 |
| spokesman | spokeswoman | 0.592484 |
| stepdaughter | stepson | 0.500262 |
| daughter | son | 1.02896 |
| sons | daughters | 1.13604 |
| mr | ms | 1.15107 |
| william | robert | 0.966206 |
| thursday | wednesday | 0.994217 |
| months | weeks | 1.09893 |
| los | angeles | 1.11654 |
| hundred | thousand | 1.35937 |

420

| $w_1$ | $w_2$ | $\frac{v_1 \cdot v_2}{\|v_1\|\|v_2\|}$ |
|---|---|---|
| tuesday | wednesday | 0.99158 |
| tuesday | thursday | 0.987584 |
| tuesday | monday | 0.986374 |
| wednesday | thursday | 0.985771 |
| monday | thursday | 0.983714 |
| october | november | 0.970944 |
| december | october | 0.969877 |
| december | february | 0.968549 |
| january | february | 0.965211 |
| january | december | 0.96206 |
| sandberger | <unk> | 1 |
| piyanart | srivalo | 0.999873 |
| hahrd | shroh | 0.990815 |
| gph04bb | str94 | 0.988308 |
| kuala | lumpur | 0.985766 |

*FIG. 4*

WORD REPLACEABILITY THROUGH WORD VECTORS

CROSS-REFERENCE TO RELATED APPLICATIONS

This application claims the benefit under 35 U.S.C. § 119(e) of U.S. Provisional Patent Application No. 62/575,242, filed on Oct. 20, 2017, and titled, "Word Replaceability Through Word Vectors," which is incorporated by reference herein in its entirety for all purposes

TECHNICAL FIELD

The present disclosure relates generally to software for language modeling and natural language processing, and more specifically to providing word replaceability through word vectors.

DESCRIPTION OF RELATED ART

Within the field of language modeling, word vector representation involves using n-dimensional vectors of weights called "word vectors", which represent words. Given datasets, word vectors can be used to capture the relationships between words in that dataset. Word vector representation has many useful applications, including speech recognition, text correction, machine translation, and other natural language processing tasks.

Vector space models, which represent text documents as vectors of identifiers, were first developed in the seventies. More recently, the success of neural networks has led to a variety of neural language models. Current methods use local context windows and a logarithm that counts how many times words appear together in various lengths of those windows.

A Global Vectors (hereinafter "Glove") model was introduced by Stanford researchers, using training data to produce "trained" word vectors that, in conjunction with machine learning algorithms, learn the semantic meaning of words from the relationships between them. This is accomplished by studying the ratio of these words' co-occurrence probabilities. For example, we may be interested in learning the meaning and relationship of the words "ice" and "steam". To do this, we can look at the probability (P) of various probe words (k) appearing in the context of these words (w). For example, the probability of "solid" appearing in the context of "ice" will be high, and the probability of "solid" appearing in the context of "steam" will be low. Thus, the ratio of P (solid|ice)/P (solid|steam) will be large. Meanwhile, the ratio of P (gas|ice)/P (gas|steam) will instead be small, since "gas" is related to "steam" but not to "ice". A word related to both "ice" and "steam", such as "water", will result in a ratio close to one, as will a word related to neither, such as "fashion". In this way, given a corpus of text, word vectors can be "trained" by examining the co-occurrence probabilities of words with various probe words.

SUMMARY

Provided are systems, methods, and devices for providing word replaceability using word vectors. In one aspect, a method of using distance metrics between words in a training dataset in order to produce trained word vectors and provide one or more word replacements is described. In some embodiments, a text corpus of sufficiently high quality is used to train word vectors. Using word vector representation, word replaceability can be determined within sentences. In some embodiments, two n-grams are considered replaceable if the n-grams have approximately the same relationship with other words (n-grams) in the vocabulary, and a relationship with other words is expressed through distances in sentences they appear in. In some embodiments, synonyms may be considered one subset of word replacements, and the system provides the identification of synonyms and non-synonyms within a text.

In some embodiments, first the text is broken down into shorter forms and then converted into n-gram combinations. The system determines how many times the n-gram combinations appear together, to determine relationships between the words. Finally, position information between words in the n-gram combinations is examined to determine and provide word replaceability information within sentences. In some embodiments, documents can be ranked not only by word appearances, but also by distance metrics between words or n-grams. In some embodiments, search engines, knowledge engines, and similar web services can provide results based in part on word replaceability results provided by the systems described herein.

BRIEF DESCRIPTION OF THE DRAWINGS

FIG. 4 illustrates an example of providing word replaceability information, implemented in accordance with some embodiments.

DETAILED DESCRIPTION

Figure 1:
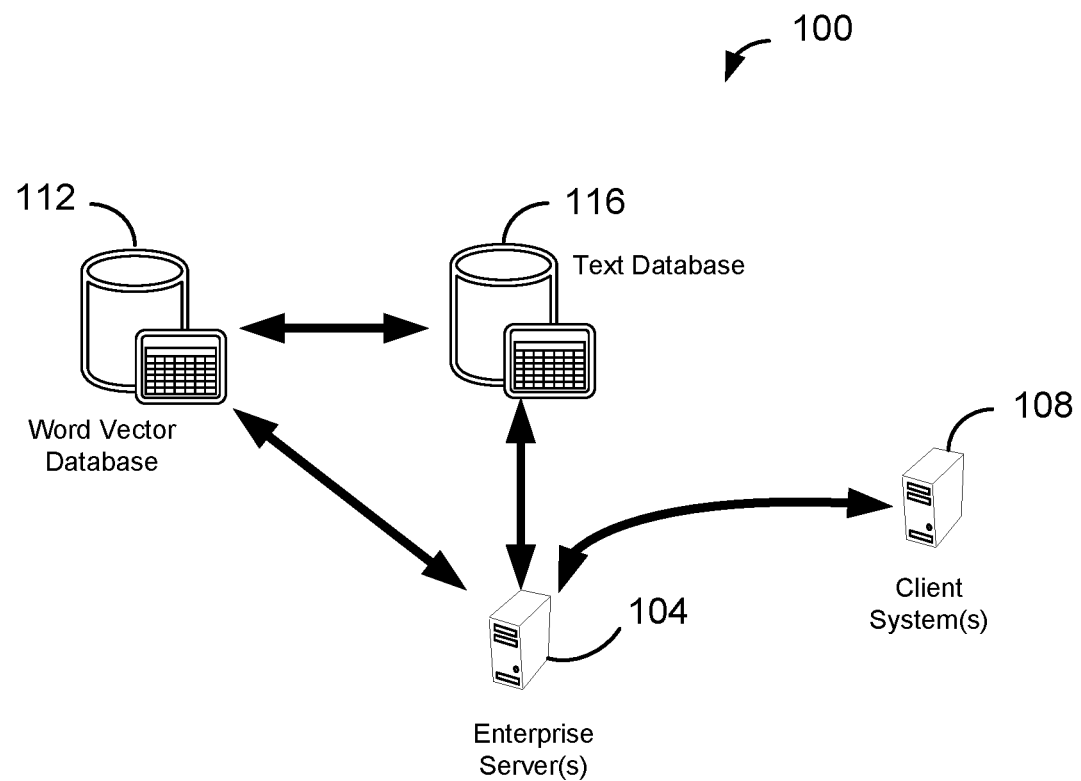
FIG. 1 illustrates an example of a system for providing word replaceability through word vectors, configured in accordance with some embodiments.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In addition, although many of the components and processes are described below in the singular for convenience, it will be appreciated by one of skill in the art that multiple components and repeated processes can also be used to practice the techniques of the present disclosure.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Traditional methods of word vector representation include vector space models, which represent text documents as vectors of identifiers, such as indices. Current methods, such as GloVe, use local context windows and a logarithm that counts how many times words appear together in various lengths of those windows. The GloVe model uses an optimization function for training vectors that employs Euclidean distances and cosine similarities between two-word vectors. This can be an effective method for measuring the linguistic or semantic similarity of the corresponding words in a text. Sometimes, the nearest neighbors according to this metric reveal rare but relevant words that lie outside the average human's vocabulary.

Optimization functions are needed to learn word vectors which can express a word's replaceability in sentences. Synonyms are a sub-group of words which can replace each other, and can be used to show differences between training on words that appear close to each other in a local window and training that only uses distances between n-grams. Word vectors trained on word distances create higher contrast in distributions of word similarities than what was accomplished in conventional methods, such as the GloVe method, where only word appearances close to each other were engaged.

Various embodiments disclosed herein provide replaceability information through word vectors. Within a database system, a text document is received and then processed into a number of sub-sentences, also referred to as tokenization. The processing may involve delimiting one or more sentences within the text document by one or more punctuation marks. Next, a number of two-word combinations are generated according to co-appearances of words within the sub-sentences. Distances are determined between the two-word co-appearances for each two-word combination. Finally, based on the determined distance metric between n-gram co-appearances, word replaceability information is provided for one or more words within the text document.

FIG. 1 shows a system diagram of an example of a system 100 for providing word replaceability through word vectors, in accordance with some implementations. System 100 includes a variety of different hardware and/or software components which are in communication with each other. In the example of FIG. 1, system 100 includes at least one enterprise server 104, at least one client system 108, at least one word vector database 112, and at least one text database 116.

Word vector database 112 can allow for storage and retrieval of word vectors. The word vector database 112 can be a database implemented in a relational or non-relational database management system. This database can include one or more word vectors. In some embodiments, word vectors are vectors of data in which words or phrases from a dataset containing a vocabulary or one or more texts are mapped to vectors of real numbers. Word vectors allow for a mathematical embedding from a space with one dimension per word to a continuous vector space with much lower dimension. In some embodiments, one or more of the word vectors within the word vector database 112 may be co-occurrence matrices, which map the distribution of co-occurring words in a text.

Text database 116 is a database that stores a plurality of text documents. In some implementations, the text documents may include one or more vocabulary datasets. In some implementations, the text documents may include one or more articles, papers, songs, speeches, long-form materials such as novels or textbooks, or any other text containing words. In some embodiments, the text database 116 may contain large sets of data or a large number of records. For example, a text database 116 may maintain a corpus of 120,000 New York Times articles dating between 1990 and 2010.

Enterprise server 104 may communicate with other components of system 100. This communication may be facilitated through a combination of networks and interfaces. Enterprise server 104 may handle and process data requests from the client system 108. Likewise, enterprise server 104 may return a response to client system 108 after a data request has been processed. For example, enterprise server 104 may retrieve data from one or more databases, such as the word vector database 112 or the text database 116. It may combine some or all of the data from different databases, and send the processed data to client system 108.

Client system 108 may be a computing device capable of communicating via one or more data networks with a server. Examples of client system 108 include a desktop computer or portable electronic device such as a smartphone, a tablet, a laptop, a wearable device, an optical head-mounted display (OHMD) device, a smart watch, etc. Client system 108 includes at least one browser in which applications may be deployed.

Figure 2:
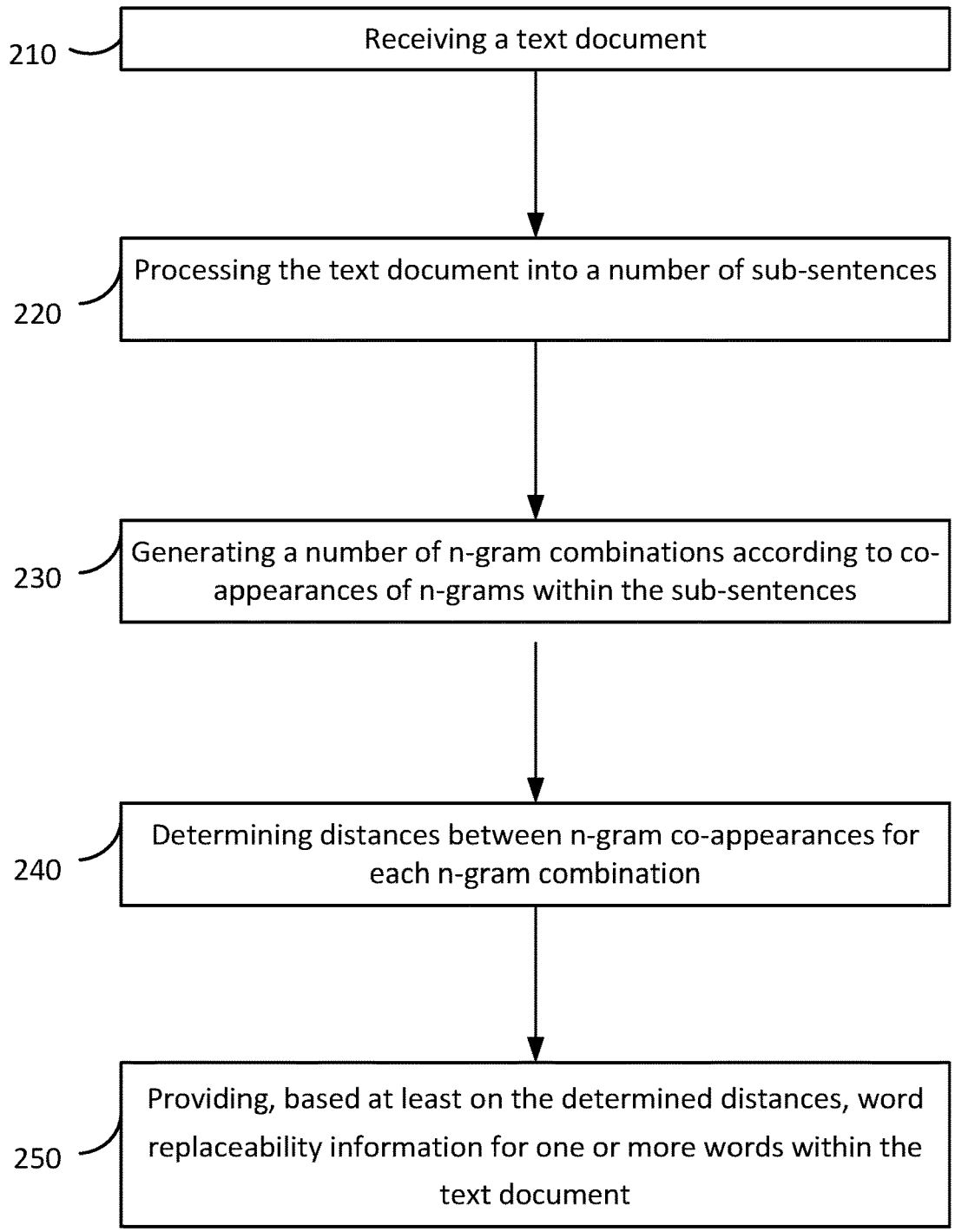
FIG. 2 illustrates a flowchart of an example of a method for providing word replaceability through word vectors, implemented in accordance with some embodiments.

FIG. 2 is a flow chart of a method for providing word replaceability data through word vectors, implemented in accordance with some embodiments. As discussed above, various components of system 100 may be configured to implement providing word replaceability information through word vectors.

At block 210, system 100 receives a text document. In some implementations, the text document is received from the text database 116. In some implementations, the client device 108 sends the text document to system 100 by uploading the text document, providing a web or computer location of the text document, or another method of providing the text document. In some implementations, the text document includes one or more vocabulary datasets. In some implementations, the text document includes one or more articles, papers, songs, speeches, long-form materials such as novels or textbooks, or any other text containing words. In some embodiment, the text document contains large sets of data or a large number of records.

In some implementations, system 100 maintains a word vector database 112 containing one or more word vectors. In some implementations, the word vectors are pre-trained. Pre-trained word vectors are word vectors in which sets of words have had machine learning algorithms applied to them, with a training dataset or a set of training words used to "train" the word vectors to be filled with words given various real number weights. In this way, system 100 can be seeded with a number of word vectors that have already been "learned" within the system. In some implementations, the word vector database 112 is initially empty and is prepared to be filled in with data.

In some implementations, a training algorithm or machine learning algorithm is performed by representing each word $w_i$ in vocabulary V by a vector $v_i$ of size N. The key to finding replaceable words is to describe their relationship with other words in the vocabulary V, and words which are replaceable will end up after training in each other's vicinities, represented by word vectors with low distance metrics. The system uses one or more distance metrics. For example, the distance metric may be Euclidean distance or cosine distance. As noted, one of the objectives is to derive a model which gives a score of whether n-gram A can be replaced with n-gram B while maintaining the same meaning in the sentence or given context. This is done using one or more distance metrics between n-grams. In some implementations, system 100 determines how many times the words appear with another word in individual context windows. In some implementations, system 100 uses cosine similarity on trained vectors. In some implementations, system 100 uses both Euclidean distance metrics and Cosine distance metrics. The count of the number of n-grams in their respective neighborhoods is represented in a histogram, also referred to as similarity histograms, and are used to train word vectors. An important factor is the ordering of words or n-grams. In some implementations, system 100 additionally trains word vectors by measuring distance metrics between n-grams, which will be further discussed below.

At block 220, system 100 processes the text document into a number of sub-sentences, also referred to as tokenization. In some implementations, this processing is a pre-processing step for training word vectors based on the text document or other text documents. In some implementations, the processing includes delimiting one or more sentences within the text document by one or more punctuation marks. For example, given a dataset such as the text document, system 100 can pre-process the dataset by breaking all sentences into sub-sentences and separating them by commas, dots, and semi-colons.

At block 230, system 100 generates a number of n-gram combinations according to co-appearances of words within the sub-sentences. For example, in the sub-sentence phrase "C is for cookie", system 100 generates the two-word combinations (C|is), (C|for), (C|cookie), (is|for), (is|cookie), and (for|cookie).

Figure 3:
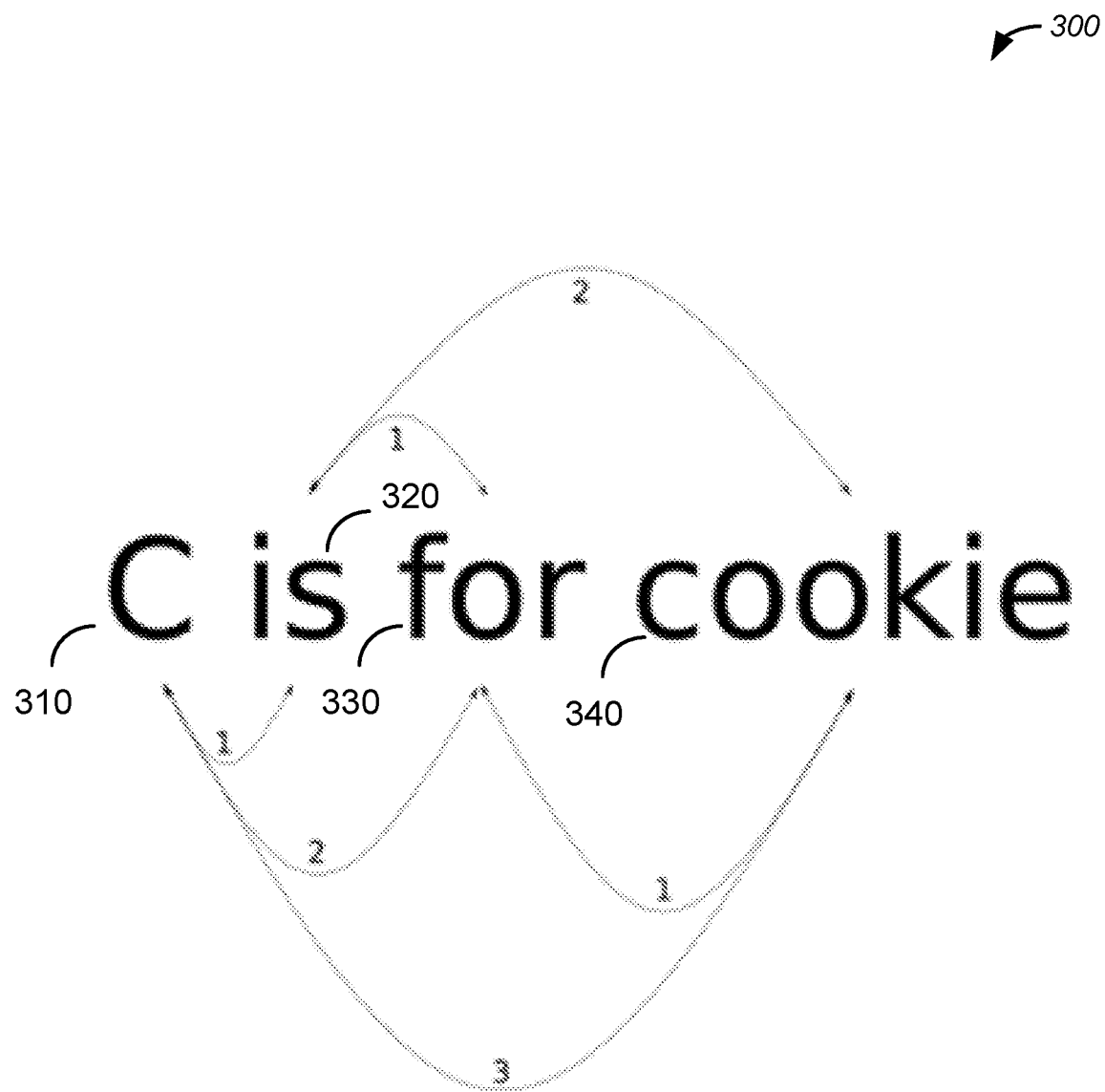
FIG. 3 illustrates an example of determining distance metrics between n-gram co-appearances, implemented in accordance with some embodiments.

At block 240, system 100 determines distances between n-gram co-appearances for each n-gram combination. FIG. 3 illustrates an example of determining distances between n-gram co-appearances, specifically for the example sub-sentence "C is for cookie". Within FIG. 3, word "C" 310 has a distance 1 from word "is" 320, a distance 2 from word "for" 330, and a distance 3 from word "cookie" 340, and so on. In some implementations, the determined distance metrics are used for optimizing word vectors according to an optimization function. In some embodiments, an example of an optimization function can be described as follows:

$$J = \sum_{i,j}^{M} a_0(i,j)\|v_i - v_j\|^2 + a_1(i,j)\|v_i - v_j\|.$$

In this example, optimization function, M, is the number of all n-grams co-occurrences (every tuple of two different words that appears only once), $a_0(i,j)$ is the number of occurrences of an n-gram tuple $(w_i, w_j)$, $a_1(i,j)$ represents the sum of distances between the same two n-grams multiplied by −2. In some embodiments, if the same word appears twice in the same sentence, system 100 does not include such a sample in training, as the Euclidean distance between the same word vector will always be 0 irrespective of optimization function, and such sample would have no influence on the final result. In some embodiments, this optimization is equivalent to optimizing by remembering the count of n-gram appearances and the average of their distances as the only thing that would differ would be the constant part of the optimization function, which system 100 removes as it does not have influence on partial derivatives. In some embodiments, in the optimization function, $a_0(i,j)$ can be thought of as a weight, because the more samples of the same word tuple there are, the more robust estimation of distance average there is, and thus higher importance is given to tuples which appear more often. In some embodiments, this optimization does not train any biases, nor does it train two vectors for each n-gram.

Returning to FIG. 2, at block 250, system 100 provides, based at least on the determined distance metrics, word replaceability information for one or more words within the text document. In some implementations, system 100 provides word replaceability information to be displayed on the client device or on one or more additional devices or user interfaces. In some implementations, the data is used to provide trained word vectors which system 100 uses to populate the word vector database 112. In some implementations, system 100 provides one or more clusters of words signifying different groups of replaceable or non-replaceable words. For example, system 100 may provide two clusters of words, one representing replaceable words and one representing non-replaceable words. In some embodiments, synonyms may be provided within the cluster of replaceable words. In some embodiments, given a word that is desired to be replaced, system 100 may provide one or more replaceable words for that word. In some embodiments, system 100 provides histograms of word similarities. In some embodiments, the histograms may represent counts of cosine similarity or distance metrics, Euclidean distance metric, and/or other criteria. In some embodiments, system 100 provides a measurement of the percentage of a histogram's area intersection for synonyms and non-synonyms, in order to provide information on the separation of synonyms from non-synonyms.

In some embodiments, system 100 provides information on the closest n-grams or words to one another within the text document, in order to provide information on word replaceability.

FIG. 4 illustrates an example of providing word replaceability information, in which the closest words which came out of a training text document are provided. In table 410, system 100 provides the closest word tuple using training of an optimization function for word vector of size 50 after 30,000 iterations. A score closer to 0 means better replaceability. In table 420, system 100 provides the closest word tuple examples according to an alternate optimization function, with word vectors of size 300. A score closer to 1 means better similarity. Table 410 employs an optimization function related to measuring distances of co-word appearances in addition to Euclidean distances and cosine similarity, whereas table 420 employs an optimization function that relies solely on Euclidean distances and cosine similarity.

In some embodiments, the word replaceability information can be used for various applications. For example, documents can be ranked not only by word appearances, but also by distances between words according to the word replaceability information provided. In some embodiments, search engines, knowledge engines, and similar web services can provide results based in part on word replaceability results provided by the systems described herein. In this way, "page ranking" can be performed within search engines, for example, according to the word replaceability information. In other applications, the word replaceability information can be provided for speech recognition, text correction, machine translation, and many other tasks within the fields of natural language processing, language modeling, and machine learning. One skilled in the art will appreciate that many uses are possible for the word replaceability information and trained word vectors across a wide range of applications.

In other embodiments, the model derived from the one or more distance metrics and the histograms can be used with any set of symbols that can be parsed. As such, the model can be used with languages other than English.

Figure 5:
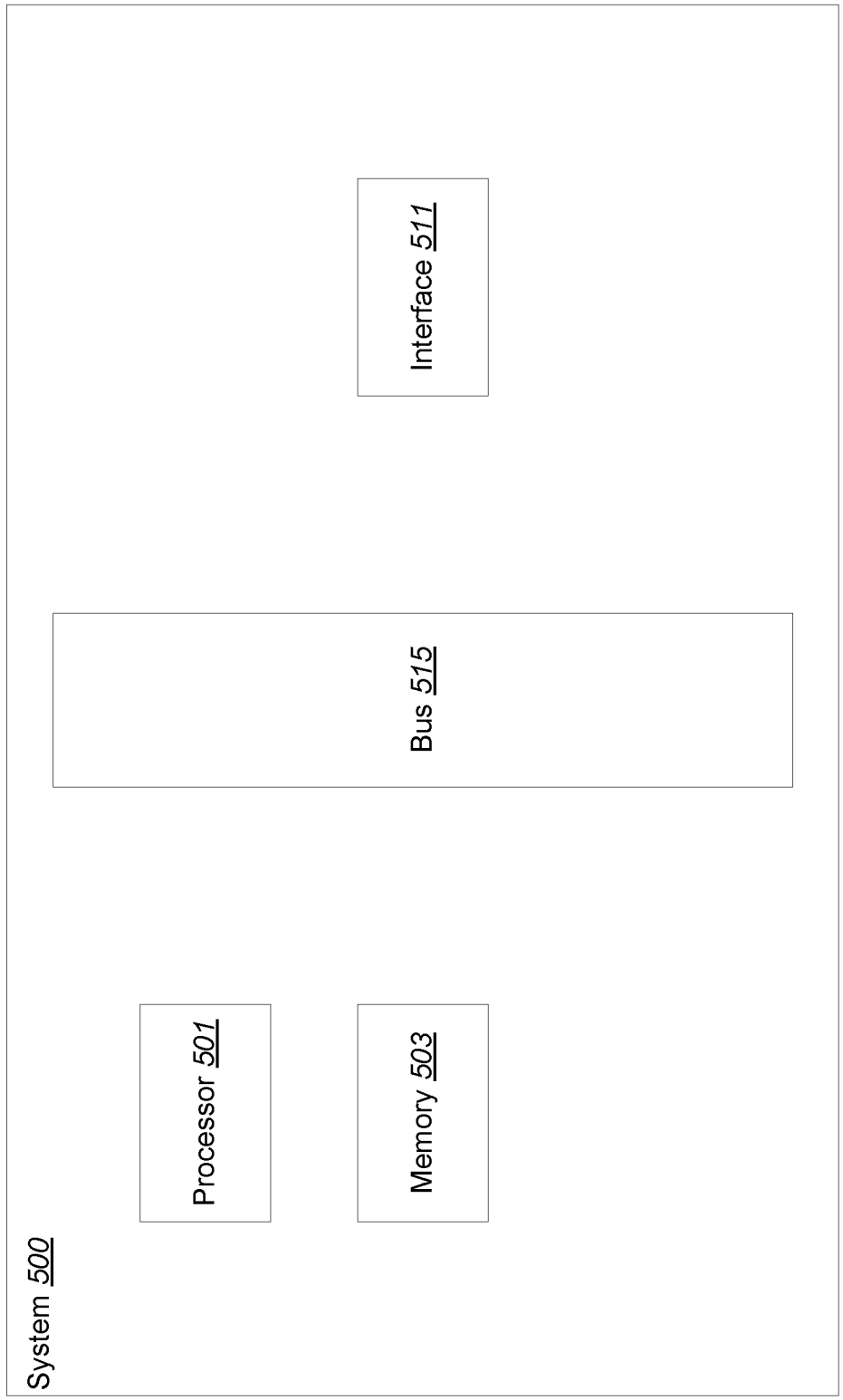
FIG. 5 illustrates an example of a computer system that can be used with various embodiments.

FIG. 5 illustrates an example of a computer system that can be used with various embodiments. For instance, the computer system 500 can be used to implement first processing device 104, second processing device 106, and/or controller 108 according to various embodiments described above. In addition, the computer system 500 shown can represent a computing system on a mobile device or on a computer or laptop, etc. According to particular example embodiments, a system 500 suitable for implementing particular embodiments of the present invention includes a processor 501, a memory 503, an interface 511, and a bus 515 (e.g., a PCI bus). The interface 511 may include separate input and output interfaces, or may be a unified interface supporting both operations. When acting under the control of appropriate software or firmware, the processor 501 is responsible for tasks such as closed loop control. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive.

What is claimed is:

1. A method of producing trained word vectors and providing a model for word replacement data, the method comprising:
receiving a text document;
tokenizing the text document into a plurality of sub-segments, including delimiting one or more sentences within the text document by one or more punctuation marks;
generating a plurality of n-gram combinations according to co-appearances of n-grams within the plurality of sub-segments;
determining a distance metric between two n-gram co-appearances for each n-gram combination;
maintaining counts of the n-gram combinations in respective sub-segments;
utilizing the counts of the n-gram combinations to train word vectors; and
providing, based at least on the distance metrics and the trained word vectors, word replaceability data for one or more n-grams within the text document.

2. A method as recited in claim 1 further comprising:
utilizing a Euclidean distance metric for deriving a language model used to provide word replacement data.

3. A method as recited in claim 1 further comprising:
utilizing a cosine distance metric for deriving a language model used to provide word replacement data.

4. A method as recited in claim 1 wherein the distances metrics are each an average of distances.

5. A method as recited in claim 1, wherein the utilizing the counts of the n-gram combinations comprises weighting based on the counts of the n-gram combinations.

6. A method as recited in claim 1 further comprising:
utilizing the distance metrics to train word vectors.

7. A system for deriving word replacement data using word vectors comprising:
a word vector hardware or software database for storing a first set of word vectors including vectors of data in which words or phrases from a dataset containing a vocabulary dataset are mapped to vectors of real numbers;
a text hardware or software database for storing a vocabulary dataset in communication with the word vector database;
an enterprise server in communication with the word vector database and the text database; and
a processor configured to perform operations comprising:
training a sub-set of the first set of word vectors using a training algorithm; and
using one or more distance metrics and a count of n-grams for deriving word replaceability data.

8. A system as recited in claim 7,
wherein the sub-set of the first set of word vectors are trained based on counts of n-gram combinations.

9. A system as recited in claim 7, wherein each of the one or more distance metrics is an average of distances.

10. A system as recited in claim 8, wherein the training algorithm weights based on the counts of the n-gram combinations.

11. A system as recited in claim 7, wherein the operations further comprise:
  providing the word replaceability data.

12. A system as recited in claim 7, wherein the operations further comprise:
  utilizing a Euclidean distance metric for deriving a language model used to provide word replacement data.

13. A system as recited in claim 7, wherein the operations further comprise:
  utilizing a cosine distance metric for deriving a language model used to provide word replacement data.

14. A system as recited in claim 7, wherein the processor is in communication with the enterprise server.

* * * * *